US005191781A

United States Patent [19]

Denz

[11] Patent Number: 5,191,781

[45] Date of Patent: Mar. 9, 1993

[54] RATIOMETRIC SIGNAL CORRECTION SYSTEM FOR A VEHICLE ELECTRONIC CONTROL SYSTEM

[75] Inventor: Helmut Denz, Stuttgart, Fed. Rep. of Germany

[73] Assignee: Robert Bosch GmbH, Stuttgart, Fed. Rep. of Germany

[21] Appl. No.: 688,960

[22] PCT Filed: Sep. 28, 1989

[86] PCT No.: PCT/EP89/01138

§ 371 Date: May 23, 1991

§ 102(e) Date: May 23, 1991

[87] PCT Pub. No.: WO91/05154

PCT Pub. Date: Apr. 18, 1991

[51] Int. Cl.[5] .......... G01M 19/00

[52] U.S. Cl. .......... 73/1 E

[58] Field of Search .......... 73/118.1, 1 E, 1 D, 73/1 R; 364/571.01, 571.04, 571.05

[56] References Cited

U.S. PATENT DOCUMENTS 4,901,561 2/1990 Glowczewski .......... 73/118.1

FOREIGN PATENT DOCUMENTS 0327130 8/1989 European Pat. Off. .

3612904 10/1987 Fed. Rep. of Germany .

3743770 7/1989 Fed. Rep. of Germany .

WO8603258 8/1989 PCT Int'l Appl. .

*Primary Examiner*—Robert Raevis

*Attorney, Agent, or Firm*—Kenyon & Kenyon

[57] ABSTRACT

A ratiometric signal correction system for use in detecting angular position of a butterfly valve in an internal combustion engine in a motor vehicle which is input from one sensor to a master control unit and slave control units. The master control unit serves as reference, and mark pulse signals are transmitted to the or each slave control unit when the butterfly valve is in either of two predetermined angular positions whereupon discrepancies between the angular positions detected by each slave control unit and the master control unit are used to generate correcting factors etc. so that the position of the butterfly valve can be detected with substantially equal accuracy in all control units.

15 Claims, 3 Drawing Sheets

RATIOMETRIC SIGNAL CORRECTION SYSTEM FOR A VEHICLE ELECTRONIC CONTROL SYSTEM

TECHNICAL FIELD

The present invention relates to a ratiometric signal correction system for a vehicle electronic control system that may be used for controlling an internal combustion engine, electronic transmission, or other vehicle components.

BACKGROUND OF THE INVENTION

Many electronic control systems in a vehicle use the throttle valve angle as a control signal. For example, an electronic throttle control uses it for a position feedback control of the butterfly valve, and a Motronic system uses it for control of fuel injection, ignition timing and in certain cases of exhaust gas recirculation. Another example is an electronic transmission control which uses a throttle valve angle to detect when to shift gears. As a result there may be a plurality of control units each requiring access to a butterfly valve angular position signal.

When, for cost reasons, only one throttle valve angle sensor is supposed to be read by more than one control unit, problems arise particularly with analog signals, and the magnitude of the signal may suffer and may not be present with the same accuracy in all control units. Variations may arise from manufacturing tolerances in components and from random operating variables such as stray voltages. Such variations can result in the fact that only one electronic control unit (ECU) can sense the throttle angle with sufficient accuracy, whereas the other ECUs will suffer considerable errors. Such errors can be a change in slope and/or a displacement or offset of the characteristic curve of voltage against butterfly valve angular position. Such errors in detection do not promote optimum or efficient operation of the internal combustion engine and other functions of the vehicle. The present invention overcomes these problems as set forth in the remainder of the specification and shown in the attached drawings.

Summary of the Invention

According to the present invention, there is a first or master ECU that determines or reads the throttle valve angle signal with full accuracy and the master ECU generates periodically trigger signals for each of the other control units ("slaves") to mark the feedback signals at two predetermined angular positions of the butterfly valve. This makes it possible for each of the slave control units to bring its characteristic curve into agreement with regard to both slope and position, or offset with those of the characteristic curve of the first or "master" electronic control unit. Any change in slope can be corrected by applying a correcting factor to the incoming analog signal multiplicatively. In most cases, in each control unit, the analog positional feedback signal is applied to an analog-to-digital converter in order to provide a digital signal for further processing and this enables any displacement or offset of the characteristic curve to be readily accommodated.

According to a feature of the present invention, the first or master control unit must have an adaptive algorithm to determine the closed throttle position and to generate an idle signal from the respective angle. The slave ECUs can either have their own idle determining algorithms to detect the idle position or can receive an idle trigger signal from the first or master ECU on an existing interface line. Adaptive determining controls are known to those skilled in the art.

Another feature of the present invention enables the second predetermined angular position of the throttle valve to be so chosen that it can reasonably be expected to be reached under normal driving conditions.

DETAILED DESCRIPTION OF THE DRAWINGS

Figure 1:
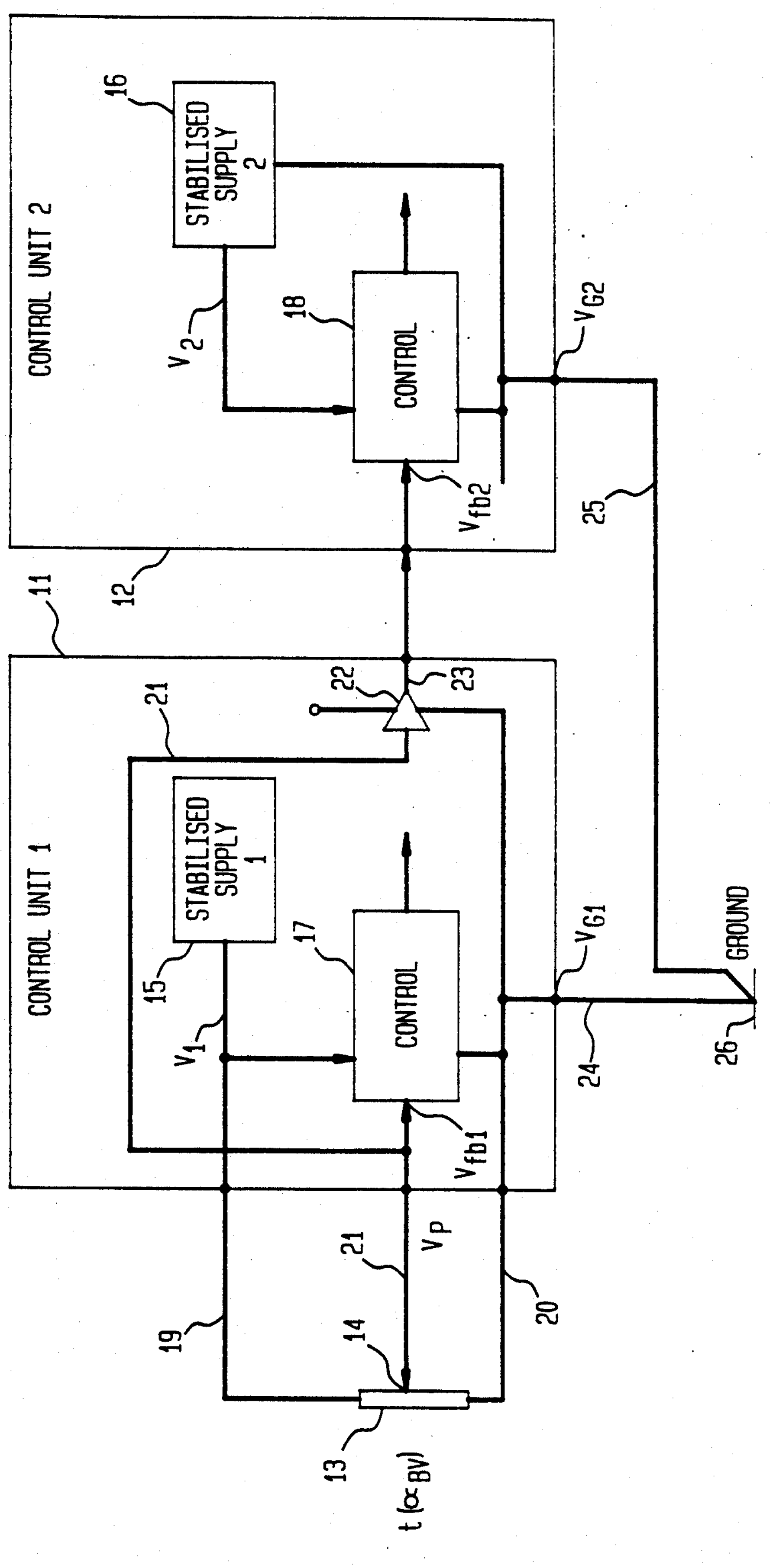
FIG. 1 (PRIOR ART)
FIG. 1 is a block diagram of part of a positional feedback signal system for two control units to illustrate how variations in characteristic curves of signal voltage in relation to angular position of a butterfly valve can arise.

Referring master to FIG. 1, 11 denotes a first control unit and 12 denotes a second or slave control unit in a vehicle with several electronic control systems for controlling an internal combustion engine and other components. The engine power is controlled through the closing and opening a butterfly valve in the intake manifold of the internal combustion engine. Such items have been omitted from the drawing for the sake of clarity as they are believed to be sufficiently well known to one skilled in the art. Associated with the butterfly valve is a potentiometer 13 whose slider 14 is moved in accordance with angular movement of the butterfly valve. Each of the control units 11 and 12 includes a stabilised supply 15 and 16, respectively, and the functional components of the control units are indicated generally at 17 and 18, respectively, bearing the legend CONTROL. Each of the controls 17 and 18, respectively, requires a throttle angle position signal to be fed to it and conveniently includes analog-to-digital converter (ADC) for converting the feedback signal to digital form for further processing. A voltage from the stabilised supply 15 of the master control unit 11 is fed to the potentiometer 13 on leads 19 and 20, and an analog voltage angular signal is drawn from the slider 14 and fed by line 21 to the control 17. The feedback signal on line 21 is also fed to a buffer 22 which provides on line 23 an angular signal for control 18 of the slave control unit 2 or for slave units. A ground connection 24 of the control unit 1 and a ground connection 25 of the control unit 2 are both taken to a common ground connection 26 which is preferably in the form of a separate electronic ground connection and is divorced from any power ground connections associated with the operation of the internal combustion engine.

Generally the voltage signal at the slider 14 of the potentiometer 13 can be represented by the expression.

$$V_p/V_a = m \cdot \alpha_{BV} + b \quad (1)$$

where Vp is the voltage at the slider 14, V1 is the voltage of the stabilised supply 15, $\alpha_{BV}$ denotes the angle of the butterfly valve, m the constant of proportionality, and b a constant. This is illustrated graphically by the continuous straight line 31 in FIG. 2 in which the ratio Vp/p1 is depicted on the vertical axis and the angular position of the butterfly valve $\alpha_{BV}$ on the horizontal axis. Since the voltage Vp at the potentiometer slider 14 and the voltage V1 from the stabilised supply 15 are both connected directly to the control 17, the angular position of the butterfly valve can be detected accurately in the first control unit 11 through a ratiometric measurement in its ADC.

The absolute angular potential applied to control 17 can be denoted by the expression $$V_{fb1}=(V_p/V_1)\cdot V_1 \quad (2)$$

where $V_{fb1}$ denotes the angular input potential. This absolute potential will vary in accordance with any variation in the voltage V1 and the absolute feedback potential $V_{fb2}$ applied to the control 18 in the slave control unit 12 will not be identical to $V_{fb1}$ since an offset (ΔVp) may be introduced by the buffer 22. Moreover the potential VG2 of the ground lead 25 of the slave control unit 12 may not be identical with VG1 of the ground lead 24 of the master control unit 11 and such difference can be represented by the expression $$\Delta V_G=V_{G2}-V_{G1} \quad (3)$$

In addition the voltage V2 of the stabilized supply 16 of the slave control unit 12 may not be identical with that V1 of the stabilised supply 15 of the master control unit 11. Thus the effective angular position of the butterfly valve detected in the slave control unit 12 can be represented by $$\begin{aligned} V_{fb2}/V_2 &= (V_{fb1} + \Delta_{op} - \Delta V_G)/V_2 = \\ &(V_p/V_1)\cdot(V_1/V_2) + (\Delta_{op} - \Delta V_G)/V_2 = \\ &(V_1/V_2)\cdot(m\cdot a_{bV} + b) + (\Delta_{op} - \Delta V_G)/V_2 \end{aligned} \quad (4)$$

Figure 2:
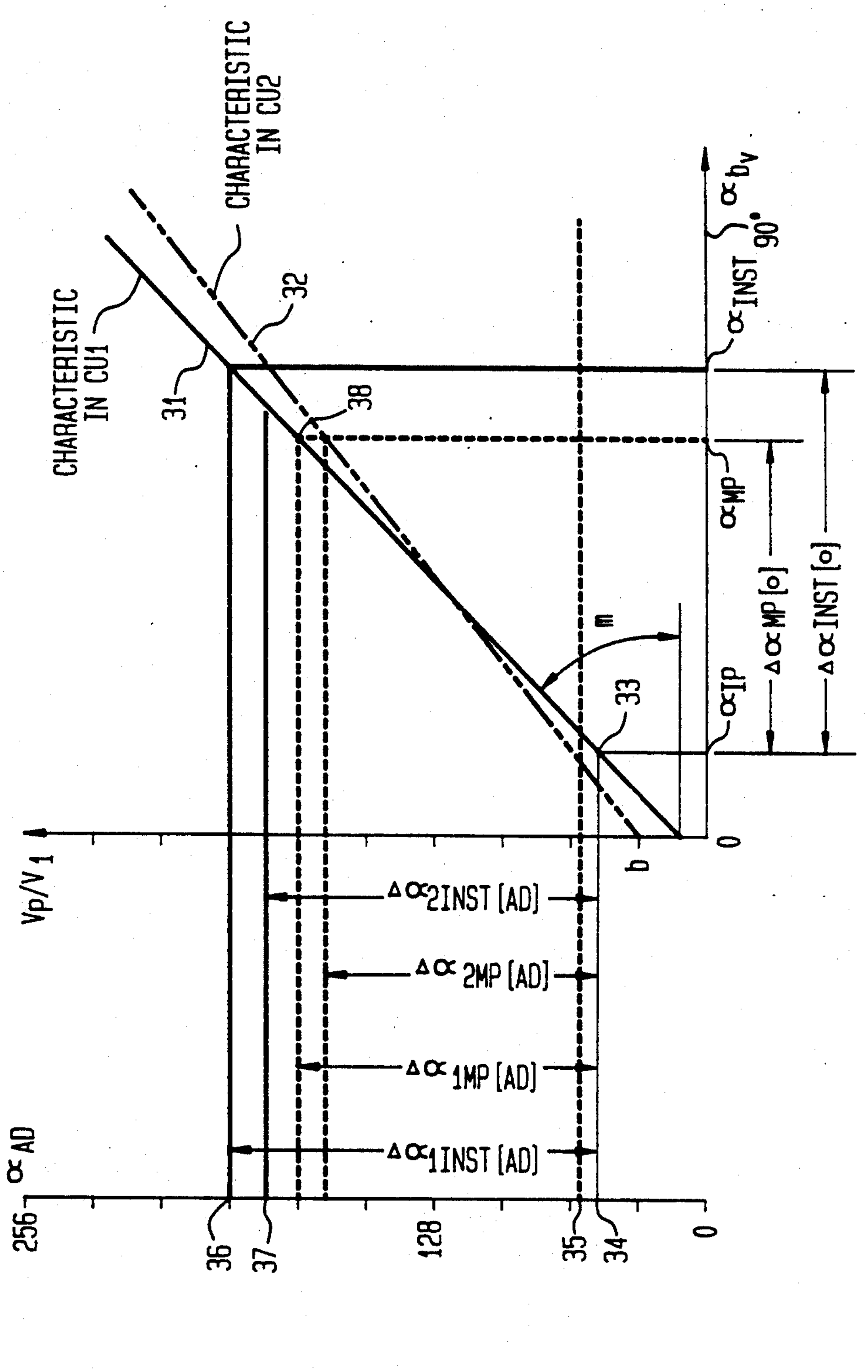
FIG. 2 is a graphical illustration of such variations in characteristic curves referred to in FIG. 1.

This characteristic is illustrated graphically in FIG. 2 by broken line 32 which it will be noted has a different slope from the straight line 31 and also a different cut-off on the vertical axis. In each of the controls 17 and 18, the ratio of the feedback voltage Vfb to the supply voltage V is converted into digital form for further processing and by way of example an arbitary digital scale $\alpha_{ad}$ is illustrated at the left-hand side whereas the angle of the butterfly valve $\alpha_{bv}$ is indicated in degrees on the horizontal axis.

In FIG. 2 $\alpha_{ip}$ represents the angular position of the butterfly valve when the engine is idling and the value 34 on the digital scale denotes the position detected by the master control unit 11 based on the characteristic curve represented by the continuous straight line 31. In contrast 35 denotes the digital value determined by the slave control unit 12 by virtue of the characteristic curve illustrated by the broken line 32. Similarly on the horizontal scale $\alpha_{inst}$ denotes an angular position to which the butterfly valve may be moved whilst the internal combustion engine is in any part or full-load operation and the values at 36 and 37 on the digital scale denote the angular positions detected by the master control unit 11 with the characteristic curve 31 on the one hand, and by the slave control unit 12 with the characteristic curve 32 on the other hand. It will be observed that the change in angular position of the butterfly valve as detected on the digital scale in the master control unit 11 and denoted by $\Delta\alpha_{1inst}$ [ad] being the difference in values 34 and 36 differs from the change $\Delta\alpha_{2inst}$ [ad] detected in the slave control unit 12 being the difference between the values 37 and 35. The actual change in angular position of the butterfly valve in degrees is denoted by $\Delta\alpha_{inst}$ [°], being the difference between the values $\alpha_{inst}$ and $\alpha_{ip}$.

It will be apparent that the actual angular position of the butterfly valve or a change in the angular position of the butterfly valve cannot be detected in the slave control unit 12 with the same accuracy as it can in the master control unit 11. This lack of accuracy is undesirable and the present invention enables this lack of accuracy to be substantially reduced or eliminated. In order to bring the characteristic curves of the slave control units into conformity with the characteristic curve of the master control unit, it is suitable if conditions at all the control units are equated at two predetermined angular positions of the butterfly valve. One of the predetermined positions of the butterfly valve can be the idling position $\alpha_{ip}$ and it is convenient to use the first control unit 11 as a reference. Periodically when the butterfly valve is in the idling position and the master ECU 11 has sensed this, it sends a mark pulse to each of the slave control units and in response thereto the idling position of the butterfly valve on the digital scale as detected in each of the slave control units is marked. Alternatively, the slave ECU(s) can have its (their) own idle determining algorithm(s). This is equivalent to bringing the broken line characteristic curve 32 into alignment with the continuous line characteristic curve 31 at the idling point 33. The second predetermined angular position of the butterfly valve can be selected quite arbitrarily but it is preferably in the region of the midpoint of the angular travel of the butterfly valve which is reached regularly even by a cautious driver who never goes at full load, and an angular position about 50° from the idling is satisfactory. The presence of the butterfly valve in the second predetermined angular position can conveniently be detected on the digital scale in the master control unit 11 and used to trigger a second mark pulse signal to be sent by the control system to the slave control unit or units to cause them to mark this position on their detected digital scale. This is equivalent to bringing the characteristic curves 32 of all the slave control unit or units into agreement with the characteristic curve 31 of the master control unit at the point 38 which corresponds to the second predetermined angular position $\alpha_{mp}$ of the butterfly valve. In FIG. 2 $\Delta\alpha_{mp}$ [°] on the horizontal axis represents the change in angular position of the butterfly valve in degrees between the idling position $\alpha_{ip}$ and the second predetermined or marking position $\alpha_{mp}\cdot\alpha\Delta_{2mp[ad]}$ on the vertical axis represents the change in position inaccurately determined on the digital scale by the slave control unit, whilst $\Delta\alpha_{1mp[ad]}$ represents the accurately detected change in position on the digital scale as obtaining in the master control unit.

Figure 3:
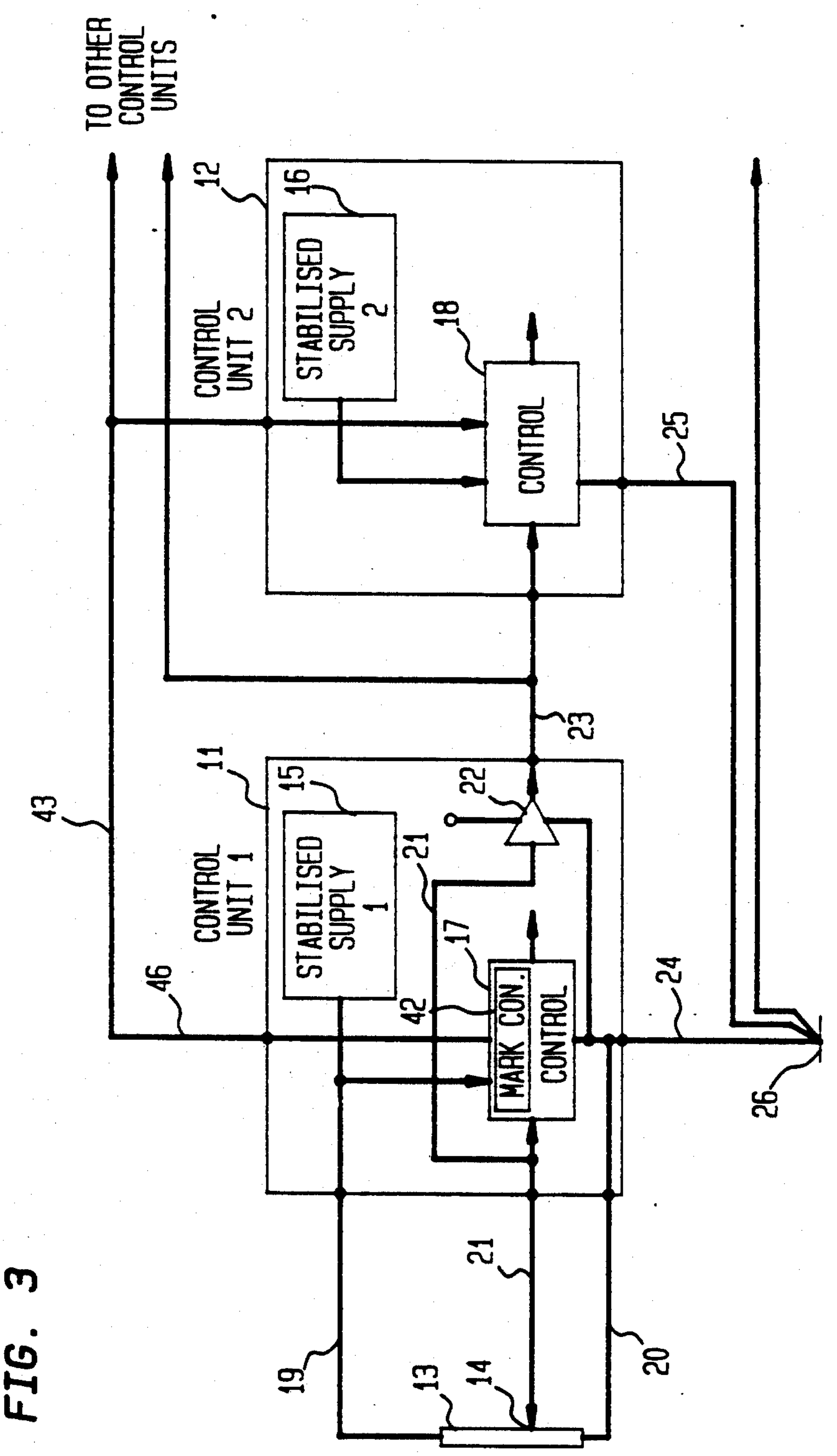
FIG. 3 is a block diagram of a set of ECUs with signal correction incorporating the present invention.

One arrangement for achieving this is illustrated in the block diagram of FIG. 3 which includes the master control unit 11 and the slave control unit 12 of FIG. 1 and, as similar parts bear the same reference numerals, they will not be described again. The master ECU 11 includes (in its control 17) a mark control 42 which periodically, when the butterfly valve is in predetermined positions, generates mark pulse signals on line 43 which are fed to the slave control unit 12 and to any other slave control units. The presence of the butterfly valve in the idling position is detected by an adaptive determining algorithm integrated in control 17 which provides an idling position signal on line 43. The presence of the butterfly valve in the second predetermined angular position is detected equally by the control 17 in the master control unit 11 which sends a corresponding signal to the line 43. The slave ECUs 12 can distinguish this mark from the idle mark through a much bigger sensed throttle angle.

Within electronic motor control i.e. so-called Motronic in combination with electronic throttle valve control (ETVC), an idle switching signal is present on a bus line provided through ETVC when the butterfly valve is in the idling position and this bus line can be used for the line 43 and the mark pulse signal can take the form of an interruption of this signal for a short duration, such as 20 ms, in response to which the idling position is marked in each of the slave control units. In this case, the ETVC would be the master control unit. The same line can also be used for the mark pulse signal in respect of the second predetermined angular position of the butterfly valve in which case the pulse signal may conveniently have a different form and a different duration so that the pulse signals can be readily distinguished from one another in case the above-mentioned way of distinguishing is not possible. This second signal can be a connection (as opposed to an interruption) of longer duration, such as 100 ms. Upon recognition of this second pulse signal each of the slave control units will mark the position of the butterfly valve as detected therein upon the digital scale and any discrepancy utilized to create a correcting factor to be applied multiplicatively to incoming positional feedback signals.

In the case where the Motronic system is the the master control unit in conjunction with an electronic transmission control (ETMC), the available trigger line $t_R$ which provides reference pulses for the angular position of the engine camshaft can be used by providing a much bigger pulse duration at either of the two points.

In FIGS. 1 and 3 the positional feedback signal on line 21 from the slider 14 passes through buffer 22 to the slave control unit or units but it is equally possible for the slave control unit or units to be supplied with the feedback signal directly that is to say in parallel with the master control unit. Moreover it is not necessary that mark pulse signals should be sent out by the mark control 42 every time the butterfly valve is in the idling position or in the second predetermined angular position and a time or cyclic control can be provided. Similarly immediate correcting action need not be taken by each of the slave control unit or units after receipt of a mark pulse signal but instead the correction can be averaged over a number of cycles.

It should be noted that the invention does not only apply to a throttle valve sensor, but to any ratiometric sensor being read by several ECUs.

I claim:

1. A ratiometric signal correction system for a vehicle electronic control system, comprising:

a sensor for detecting a predetermined vehicle parameter that changes in response to changing operating conditions of the vehicle and generating an output signal representative of the changing vehicle parameter;

a first control unit that receives, as an input signal, the output signal from the sensor that is representative of the changing vehicle parameter, the first control unit providing a supply voltage input to the sensor and generating reference signals corresponding to predetermined states of the sensor; and at least one second control unit that receives, as an input signal, the output signal from the sensor that is representative of the changing vehicle parameter, and the reference signals from the first control unit for correcting inaccuracies in the detected changes in the vehicle parameter at the second control unit.

2. The system as recited in claim 1, wherein the first and second control units each have an individual voltage supply.

3. The system as recited in claim 1, wherein the sensor includes a throttle valve angle sensor.

4. The system as recited in claim 1, wherein the system further includes a buffer through which the reference signals are fed to the second control unit through a buffer stage.

5. The system as recited in claim 1, wherein the first control unit includes a reference signal generating means for generating the reference signals.

6. The system as recited in claim 5, wherein the reference signal generating means generates reference signals at two predetermined sensor states.

7. The system as recited in claim 6, wherein one of the predetermined sensor states corresponds to an idling state of a vehicle engine.

8. The system as recited in claim 6, wherein one of the predetermined sensor states corresponds to a partly loaded state of a vehicle engine.

9. A ratiometric signal correction system for a vehicle electronic control system, comprising:

a sensor for detecting changes in an angular position of a throttle valve and generating an output signal representative of the changes in the angular position of the throttle valve;

a first control unit that receives, as an input signal, the output signal from the sensor that is representative of the changes in the angular position of the throttle valve, the first control unit providing a supply voltage input to the sensor and generating reference signals corresponding to predetermined states of the sensor; and at least one second control unit that receives, as an input signal, the output signal from the sensor that is representative of the changes in the angular position of the throttle valve, and the reference signals from the first control unit for correcting inaccuracies in the detected changes in the vehicle parameter at the second control unit.

10. The system as recited in claim 9, wherein the first control unit includes a reference signal generating means for generating the reference signals.

11. The system as recited in claim 10, wherein the reference signal generating means generates reference signals at two predetermined sensor states.

12. The system as recited in claim 11, wherein one of the predetermined sensor states corresponds to an idling state of a vehicle engine.

13. The system as recited in claim 11, wherein one of the predetermined sensor states corresponds to a partly loaded state of a vehicle engine.

14. The system as recited in claim 9, wherein the first and second control units each have an individual voltage supply.

15. The system as recited in claim 9, wherein the system further includes a buffer through which the reference signals are fed to the second control unit.

* * * * *

UNITED STATES PATENT AND TRADEMARK OFFICE

CERTIFICATE OF CORRECTION

PATENT NO. : 5,191,781

DATED : March 9, 1993

INVENTOR(S) : Denz

It is certified that error appears in the above-indentified patent and that said Letters Patent is hereby corrected as shown below:

Title page, item [57],

| | |
|---|---|
| In the Abstract | line 2, before "angular" insert --the--; |
| Column 2 | line 42, after " includes" insert --an--;<br>line 61, change "$V_p/V_a$" to --$V_p/V_1$--;<br>line 68, change "$V_p/_p1$" to --$V_p/V1$--; |
| Column 3 | line 30, after "by" insert --the expression--; |
| Column 4 | line 49, change "$\alpha_{mp} . \alpha\Delta_{2mp[ad]}$" to --$\alpha_{mp} . \Delta\alpha_{2mp[ad]}$--. |

Signed and Sealed this

Twenty-eighth Day of June, 1994

Attest:

Bruce Lehman

BRUCE LEHMAN

*Attesting Officer* *Commissioner of Patents and Trademarks*